US009785675B2

(12) United States Patent
Marsh et al.

(10) Patent No.: US 9,785,675 B2
(45) Date of Patent: Oct. 10, 2017

(54) SYSTEM AND METHOD FOR CLASSIFYING AND STORING WELL DATA

(75) Inventors: Laban M. Marsh, Houston, TX (US); Wilbert Joseph Chenevert, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1809 days.

(21) Appl. No.: 11/058,972

(22) Filed: Feb. 16, 2005

(65) Prior Publication Data

US 2006/0195646 A1 Aug. 31, 2006

(51) Int. Cl.
*G06F 17/30* (2006.01)
*G06F 12/0866* (2016.01)

(52) U.S. Cl.
CPC .... *G06F 17/30516* (2013.01); *G06F 12/0866* (2013.01)

(58) Field of Classification Search
USPC .......................................... 707/603, 607; 702/6
See application file for complete search history.

(56) References Cited

U.S. PATENT DOCUMENTS 4,686,625 A * 8/1987 Bryan .................... 702/6
5,864,772 A 1/1999 Alvarado et al. .............. 702/9
6,101,445 A 8/2000 Alvarado et al. .............. 702/9
6,430,547 B1 8/2002 Busche et al. .............. 707/1
6,464,011 B2 * 10/2002 Tubel .................... 166/313
6,519,568 B1 * 2/2003 Harvey et al. .............. 705/1.1
6,633,874 B1 10/2003 Nusbickel .............. 707/10
6,826,492 B2 * 11/2004 Newman .................... 702/45
6,980,929 B2 * 12/2005 Aronstam et al. .......... 702/188
2002/0020533 A1 * 2/2002 Tubel .................... 166/313
2002/0107835 A1 * 8/2002 Coram et al. .............. 707/1
2003/0014506 A1 1/2003 Schabernack et al. ....... 709/223
2003/0074139 A1 * 4/2003 Poedjono .................. 702/16
2003/0115186 A1 6/2003 Wilkinson et al. .......... 707/3

FOREIGN PATENT DOCUMENTS

JP 2001265821 A 9/2001

* cited by examiner

*Primary Examiner* — Joshua Bullock
(74) *Attorney, Agent, or Firm* — John W. Wustenberg; Baker Botts L.L.P.

(57) ABSTRACT

Embodiments of systems and methods for classification and storage of acquired well data according to the invention are disclosed. In one embodiment of the invention a system for handling information generally includes, but is not limited to, a sensor associated with a well and a memory coupled to receive data from the sensor and store the data. The system also includes a processor programmed to read data identified as active from the memory and programmed to read other data from an electronic storage, where the memory is capable of being read at higher speed than the electronic storage.

4 Claims, 7 Drawing Sheets

500

| | |
|---|---|
| WELL ID #1 | RUN ID #4 |
| WELL ID #1 | RUN ID #5 |
| WELL ID #2 | RUN ID #2 |
| WELL ID #2 | RUN ID #3 |
| WELL ID #2 | RUN ID #4 |
| WELL ID #3 | RUN ID #7 |
| WELL ID #4 | RUN ID #1 |
| WELL ID #4 | RUN ID #2 |
| WELL ID #4 | RUN ID #3 |
| WELL ID #4 | RUN ID #4 |
| WELL ID #5 | RUN ID #1 |
| WELL ID #5 | RUN ID #2 |
| WELL ID #5 | RUN ID #3 |

510 (rows 1–2)

520 (row 6)

*FIG. 5*

SYSTEM AND METHOD FOR CLASSIFYING AND STORING WELL DATA

BACKGROUND

The present invention relates to the field of information handling. In particular, the invention relates to a method and system for classifying and storing acquired well data.

During conventional well servicing operations, a large amount of data describing or corresponding to the well can be produced by instruments, sensors, and/or tools. Some of those instruments, sensors, and/or tools are lowered into the well. A lowered instrument, sensor, or tool can acquire data and send it to the surface. For example, a tool can be connected to the surface by a conductor for electrical communication techniques. In another situation, an instrument can use a wireless communication protocol to communicate with a receiver on the surface. The instrument, sensor, or tool can also store data acquired while lowered and transfer that data once it has been retrieved to the surface. In each of these situations, the data is received at the surface and can then be processed, stored, and/or transferred to a format in which it can be used, e.g., to make decisions.

The acquired data can include measurements of geophysical qualities. Those measurements can correspond to the depth at which they were taken. For example, a tool that is lowered into a well can induce electrical or magnetic activity in the surrounding formation at a particular depth and record measurements of that activity. When the data is received at the surface, it can be associated with the depth at which is was measured.

BRIEF DESCRIPTION OF THE DRAWINGS

FIG. 5 is a data structure diagram according to one embodiment of a system for handling well data.

DETAILED DESCRIPTION

Figure 1:
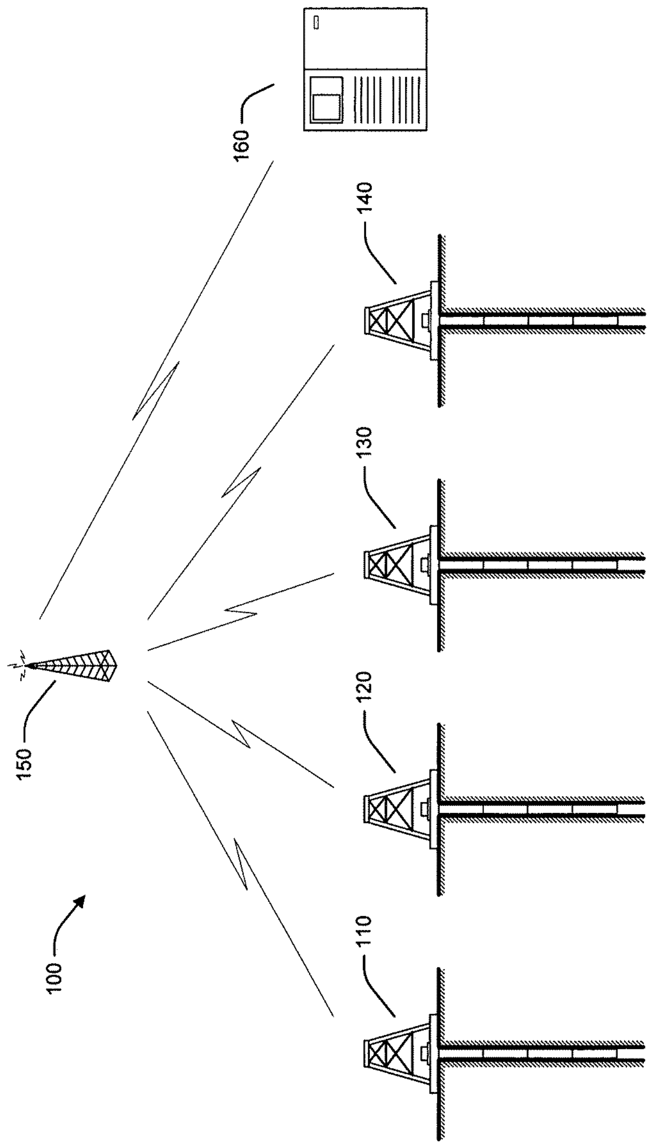
FIG. 1 is a diagram of a plurality of wells suitable for use of one embodiment of a system for handling well data.

A well data system 100 in which one embodiment of a system for handling well data can be utilized is illustrated in FIG. 1. In the particular embodiment shown, each well 110, 120, 130, 140 communicates data describing or corresponding to that well to a computer system 160 using a wireless protocol and a tower 150. The particular data communicated can be generated from many sources. For example, a tool lowered into the well can measure physical properties at a particular depth. As another example, an instrument can measure properties at the surface of the well. The data from several sources at a well can be combined at the rig-site and transmitted to the computer system 160 for classification, storage, and/or access.

While the wells are shown as vertical land wells for petroleum products, the invention can also be used in other environments where well data is acquired. For example, the system can be used with land wells that deviate from vertical toward a horizontal orientation. As another example, the system can be used with subsea wells that are either vertical or deviate toward horizontal. While a plurality of wells are depicted, well data from a single well could be classified and/or stored using an embodiment of the invention. The location of the wells can also be varied. For example, a computer system 160 could be configured to receive well data from land wells on several different continents in addition to well data from subsea wells.

The particular communication technology that is shown can also be modified. For example, the tower 150 could be replaced by a satellite with each well 110, 120, 130, 140 sending data to the satellite, which would relay the data to the computer system 160. In another embodiment, each well 110, 120, 130, 140 can individually communicate its data to the computer system 160 using a wireless communication technology, e.g., a radio or laser link. In another embodiment, each well 110, 120, 130, 140 is connected by wire to the computer system 160. Examples of such a connection, among other possibilities, would include a dedicated network functioning only to transfer the well data or connections to the Internet or other public network that transfers information for a wide variety of uses. The communication between the wells 110, 120, 130, 140 and the computer system 160 could also employ a combination of technologies. For example, the well data could be transmitted wirelessly from the wells to a central point at which it would be processed into a format suitable for transmission across a public network to the computer system 160.

Figure 2:
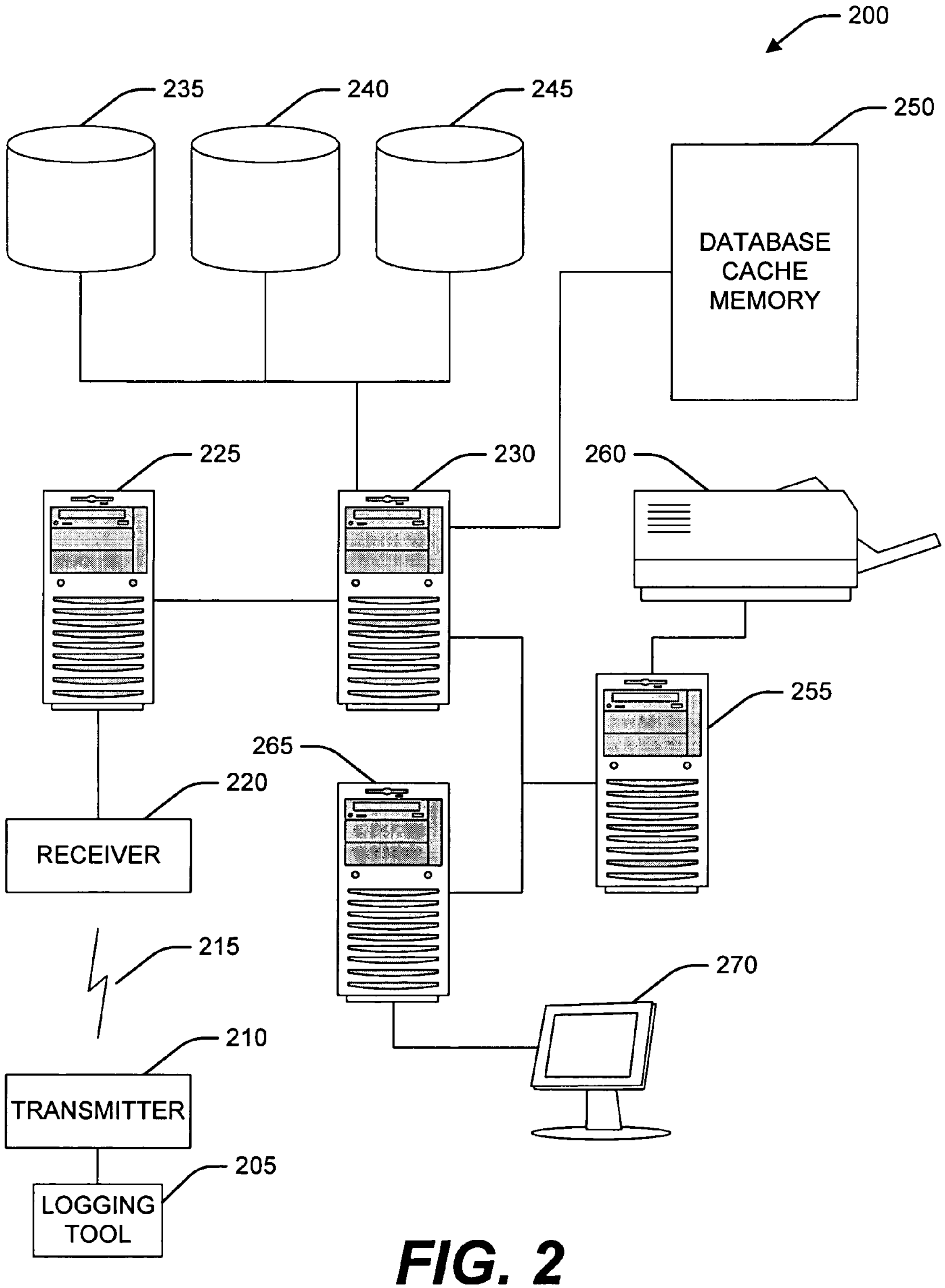
FIG. 2 is a block diagram of one embodiment of a system for handling well data.

One embodiment of a system 200 for handling well data is illustrated in FIG. 2. A logging tool 205 makes measurements of the formation in which the well has been or is being drilled. For example, one logging tool can produce an electrical field in the formation and measure the response of the formation to determine its conductivity. Other examples of well data include, but are not limited to, Nuclear Magnetic Resonance (NMR) measurements, sonic measurements, and azimuthal measurements. Such measurements can be made at different depths in the well. The logging tool can make measurements in a well that was already been drilled or can make measurements as the well is being drilled in a Logging While Drilling (LWD) application. Logging tool 205 is just one example of many instruments and sensors that can produce data describing or corresponding to the well.

The logging tool 205 is connected to transfer data it produces to a transmitter 210 that uses a wireless signal 215 to transfer the data to a receiver 220. Many different wireless signal technologies are available. For example, the transmitter 210 can use acoustic pulse telemetry or electromagnetic (EM) telemetry to send data to the receiver 220. In another embodiment, the logging tool 205 has a wired connection to the receiver 220. For example, an Asymmetric Digital Subscriber Line (ADSL) can be connected between the logging tool 205 and the receiver 220. The transmitter 210 would then include a modem and the wireless signal 215 would be replaced by a conductive path. The disclosed system can be used with any telecommunications technology transferring the data from the logging tool 205.

Figure 4:
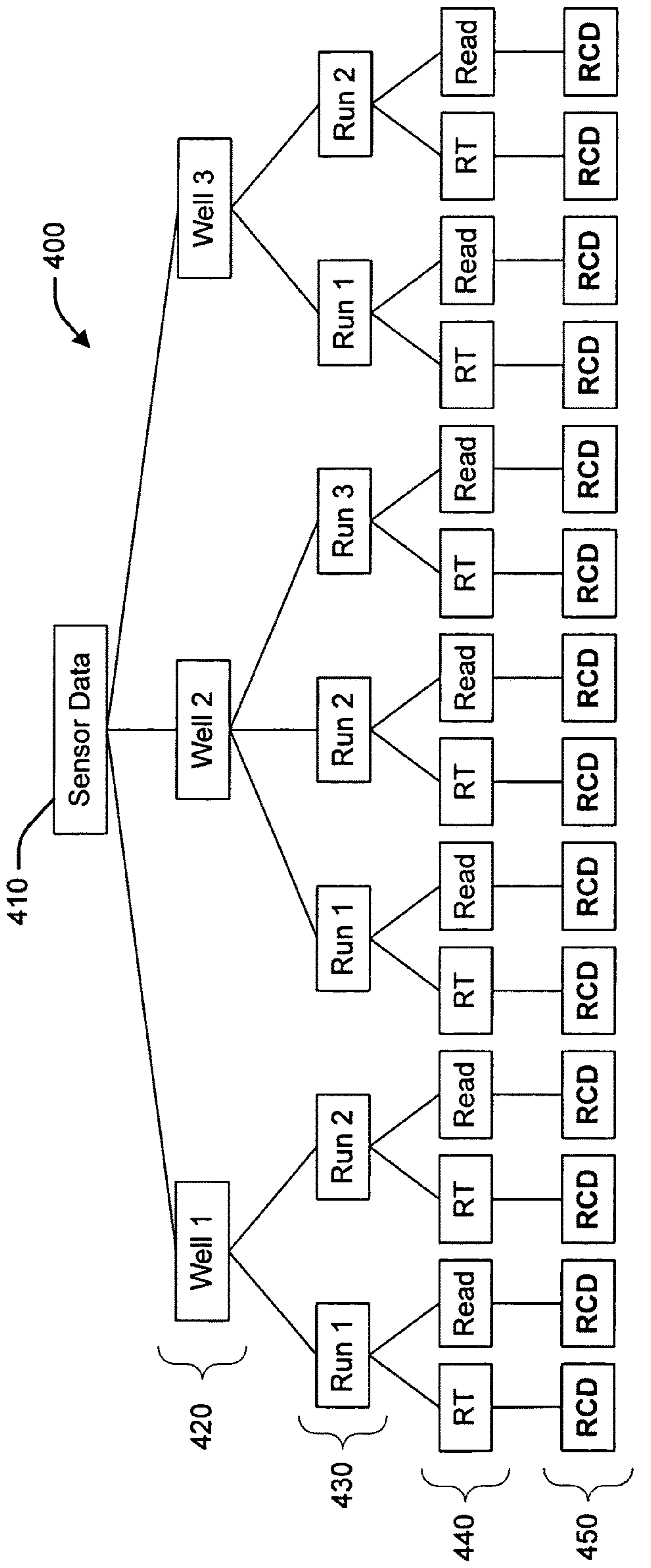
FIG. 4 is a classification diagram for well data according to one embodiment of a system for handling well data.

The data produced by the logging tool 205 is received by a data acquisition application 225. An application includes, but is not limited to, any set of instructions that cause a processor to handle information. While several applications 225, 230, 255, 265 are illustrated as executing on separate computers, that is not the only manner in which such applications can be present. For example, one computer can execute multiple applications. One application can also be executed by several computers. For example, many database management software applications are executed by several computers. The data acquisition application 225 can associate the received data with keys that describe the data to assist in classifying, reading, and storing the data. An example of keys associated with data is illustrated in FIG. 4. The data acquisition application 225 can also modify the format the data so that it is compatible with the database application interface 230. The data acquisition application 225 then sends the data to the database application interface 230. In one embodiment, the data is sent with a write statement or append statement.

The database application interface 230 is coupled to the data acquisition application 225 and data processing applications 255, 265. Additional data acquisition applications and data processing applications can also be coupled to the system. One or more of the data processing applications 255, 265 can subscribe to receive particular categories of data from the database application interface 230. Such a subscription includes the keys that correspond to the data that the subscribing application is instructing the database application interface 230 to send to it. For example, data processing application 255 can instruct the database application interface 230 to send it any received data for a particular well, if a well identifier is one of the data keys. When the database application interface 230, receives data from the data acquisition application 225 it compares the keys for that data to the instructions it has received from subscribed applications. Where there is a match, the database application interface 230 forwards that data to the corresponding subscribed application.

The database application interface 230 is coupled to several storage devices, including a database cache memory 250. In one embodiment, the database cache memory 250 is implemented as random access memory of the computer on which the database application interface 230 is being executed. The database application interface 230 reads data from and writes data to the database cache memory 250. The storage devices coupled to the database application interface 230 also include hard disks 235, 240, and 245. In one embodiment, other types of electronic storage such as flash memory and/or optical storage devices can be used instead of or in addition to the hard disks 235, 240, and 245. Examples of optical storage devices include CDs and DVDs. The database application interface 230 reads data from and writes data to the hard disks 235, 240, and 245. In another embodiment, the hard disks can be replaced by another type of electronic storage that has slower read access than the database cache memory. For example, one or more optical drives could be used instead of the hard disks 235, 240, and 245. As another example, random access memory with slower access time than the database cache memory could be used instead of the hard disks 235, 240, and 245.

The database application interface 230 maintains a data structure in the database memory cache 250 that identifies data keys that accompany active data. A example of such a data structure is described in more detail in FIG. 5. In another embodiment, the active keys data structure is maintained in another electronic storage to which the database application interface 230 has access. In one embodiment, data keys are only active when the corresponding sensor is collecting information. For example, some sensors may be run downhole without collecting data until they receive a communication. Such operation can conserve battery power and reduce wear on the tool. In another embodiment, data keys are identified as active in the data structure according to different criteria.

When the database application interface 230 receives requests to write or read well data, those requests include information from which the data keys can be determined. For example, a database query received from data processing application 255 can specify data keys for the data to be read. The database application interface 230 compares the data keys for the read or write request to the data keys identified in the active keys data structure to determine whether the data has been identified as active. If the data that is requested to be written or read is active, the database application interface 230 accesses the data in the database memory cache 250. If the data is not active, the database application interface 230 accesses the data in the hard disks 235, 240, 245. In one embodiment, a request to write data identified as active will also result in the data being written to the hard disks 235, 240, 245 in addition to the database memory cache 250.

In one embodiment, both the database memory cache 250 and the hard disks 235, 240, 245 use a read and write lock architecture. As a result, data that is being read cannot at the same time be written and data that is being written cannot at the same time be read. A database query that results in a read request can be delayed if the data requested is currently be written. In one embodiment, the structures used in storing well data in the database memory cache 250 are different than the structure used to store well data in hard disks 235, 240, 245. Different structures can be employed to reduce the average read and write times for each type of media.

Once data processing applications 255, 265 receive well data—as a result of subscriptions, database queries, or some data transfer—that data can be displayed or processed in whatever manner is most useful. For example, well data can be displayed visually on a monitor 270 for review by a decision maker. Well data can also be printed as a log at a printer 260. Data processing applications 255, 265 can also modify well data and send the modified data to the database application interface 230. The database application interface 230 will then store that data based on the keys with which it is associated. If those keys identify the data as active, the modified data is stored in the database cache memory 250. In some embodiments, modified data identified as active is also stored in the hard disks 235, 240, 245. If the modified data is not identified as active, the database application interface 230 stores it in the hard disks 235, 240, 245.

Figure 3:
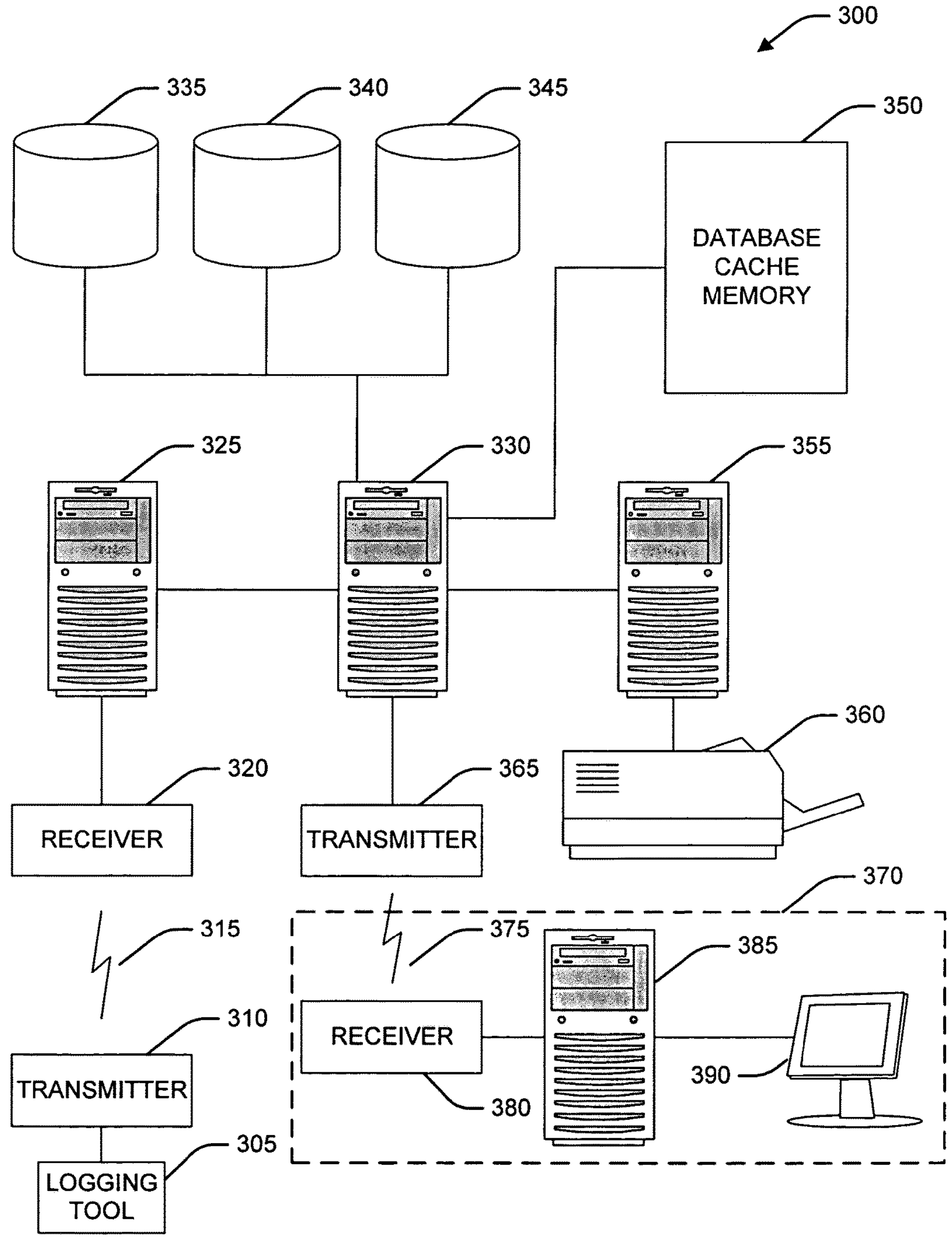
FIG. 3 is a block diagram of one embodiment of a system for handling well data.

Another embodiment of a system 300 for handling well data is illustrated in FIG. 3. System 300 is similar to system 200 in that it includes a logging tool 305, transmitter 310, receiver 320, data acquisition application 325, database application interface 330, hard disks 335, 340, 345, a database cache memory 350, data processing application 355, and printer 360. The various alternatives discussed for those elements with respect to system 200 are also applicable with respect to system 300.

System 300 also discloses a remote system 370. Remote system 370 is depicted as communicating with the database application interface 330 using a wireless signal 375 as just one example. Remote system 370 can communicate with database application interface 330 using any appropriate telecommunications technology, such as a satellite link, private network, or public network such as the Internet. Data processing application 385 can send database queries to the database application interface 330 and subscribe to receive particular types of incoming data in the same way as the local data processing application 355. Data processing application 385 can also modify well data and send the modified data to the database application interface 330. The database application interface 330 will then store that data based on the keys with which it is associated. If those keys identify the data as active, the modified data is stored in the database cache memory 350. In some embodiments, modified data identified as active is also stored in the hard disks 335, 340, 345. If the modified data is not identified as active, the database application interface 330 stores it in the hard disks 335, 340, 345. Well data received by data processing application 385, whether by subscription or a database query, can then be displayed on a monitor 390.

A classification diagram 400 for well data according to one embodiment of a system for handling well data is depicted in FIG. 4. In one embodiment, the sensor data 410 corresponding to a well is associated with a set of keys that are used to store, retrieve and process the data 410. One key that can be associated with the data 410 is the well key 420. The well key 420 identifies the well with which the data is associated. For example, LWD results for Well 2 would include a well key 420 identifying Well 2. Another key that can be associated with the data 410 is the run key 430. The run key 430 identifies the number of times that a repetitive data acquisition task has been performed. In a particular embodiment, the run key 430 is equal to the number of round trips (in and out) of the sensor or tool into the well. For example, if the LWD results for Well 2, discussed above, were obtained during the second trip for those tools into the well, the LWD results would include a run key 430 with the value 2.

In one embodiment, the well and run keys 420, 430 are used to determine whether data is identified as active. Additional keys can then be used for locating and organizing data without regard to whether that data is active. In other embodiments, the additional keys can be used instead of or in addition to the well and run keys 420, 430 to determine whether data is identified as active.

Another key that can be associated with the data 410 is the description key 440. Two potential values for the description key 440 are Real-Time (RT) and Read. Well data that is acquired by a tool, sensor, or instrument while that device is still downhole has a description key value of Real-Time. Well data that is acquired by from a tool, sensor, or instrument once it reaches the surface has a description key value of Read. In one embodiment, this distinction is important because well data acquired from the tool at the surface, i.e., sensor data 410 with a Read description key 440, can have higher resolution and density than data that is acquired from the tool while it is still located downhole, i.e., sensor data 410 with a RT description key 440. For example, if the LWD results discussed above were sent by the tool to the well surface using EM telemetry, the LWD results would include a description key 440 with the value RT.

Another key that can be associated with the data 410 is the record key 450. The record key 450 can have several values corresponding to the type of data being acquired. For example, surface data logging is a type of data which may be associated with a record key 450 of value SDL. The type of data can also be identified by setting the value of the record key 450 equal to the name of the tool or tool type that was used to acquire the data. For example, the LWD results discussed above could have a record key 450 equal to LWD.

The classification diagram 400 indicates that there can be dependence between some of the various keys. In this particular example, while there is sensor data 410 from Run 3 on Well 2, there is no sensor data 410 from Run 3 on Well 1. The available keys may also change over time. Additional runs of tools can generate new run keys 430. Well data from a new well could be acquired generating a new well key 420 to describe it. Database queries can specify values for one or more keys to describe the types of data that should be returned.

A data structure diagram according to one embodiment of a system for handling well data is depicted in FIG. 5. The data structure 500 specifies combinations of data keys that correspond to active well data. In one embodiment, well data is identified as active if it is described by a combination of a well key 420 and run key 430 that are included in the data structure 500. For example, data acquired during runs 4 and 5 in the first well is identified as active. In that example, if a data processing application 255 sends a database query to the database application interface 230 that identifies data acquired during run 5 on well 1, the database application interface 230 will read that data from the database cache memory 250. As another example, if a data processing application 255 sends a database query to the database application interface 230 that identifies data acquired during run 3 on well 1, the database application interface 230 will read that data from the hard disks 235, 240, 245. While the depicted data structure 500 uses well and run keys to identify active well data, the data structure 500 could use additional or different keys to identify active well data.

The data structure 500 can be maintained in the database memory cache 250 or in another electronic storage to which the database application interface 230 has access. The data processing applications 255, 265 can also store a copy of the data structure 500. In one embodiment, changes to the data structure 500 are communicated to the data processing applications 255, 265 so that the identification of active well data is consistent. When the database application is initiated or started up, the data structure 500 is generated and data on the hard disks 235, 240, 245 that is identified as active is copied to the database cache memory 250. When changes are made to the data structure 500, the database cache memory 250 is updated to include well data corresponding to the new active identifications. In one embodiment, if there is no data stored on the hard disks 235, 240, 245 that corresponds to a particular active combination of data keys, then the database application interface 230 creates a record structure for storing new data that is received from the data acquisition application 225 and initializes an empty area of the database memory cache 250.

In one embodiment, changes to the data structure 500 can be made based on a set of heuristics that remove the active identification from well data that is not accessed often. In another embodiment, changes to the data structure 500 can be made based on a set of heuristics that remove the active identification from well data that does not currently have a real-time input stream attached to it. Changes in the data structure 500 can be made to maximize the amount of real-time data stored in the database memory cache 250. The set of heuristics can be modified depending on the amount of space available in the database memory cache 250.

Figure 6:
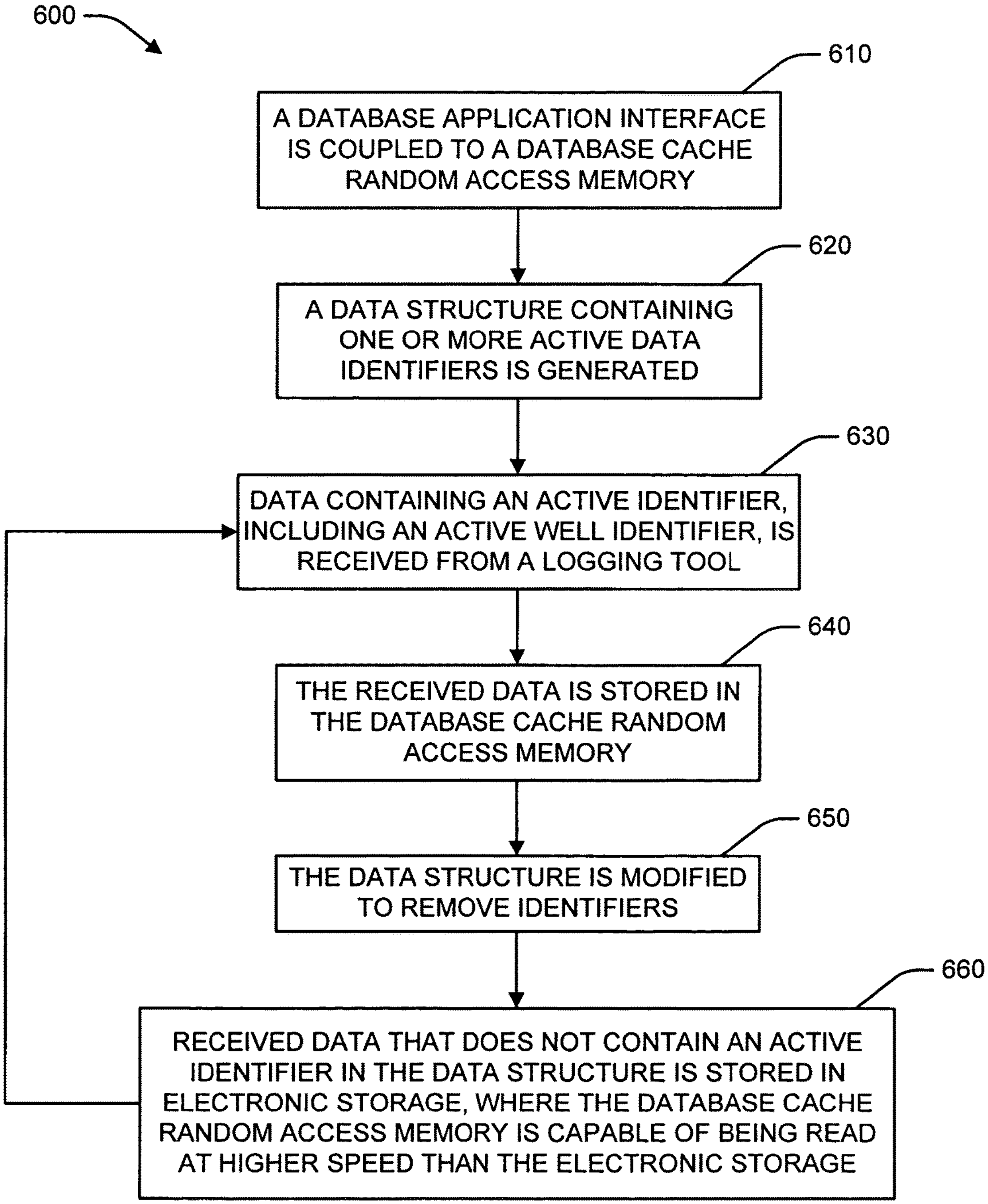
FIG. 6 is a flow chart of one embodiment of a method for configuring a database application interface.

A flow chart of one embodiment of a method 600 for configuring a database application interface is illustrated in FIG. 6. In the first step 610, a database application interface is coupled to a database cache random access memory. In the next step 620, a data structure containing one or more active data identifiers is generated. FIG. 5 illustrates one embodiment of such a data structure. In the next step 630, well data containing an active identifier, including an active well identifier, is received from a logging tool. In the next step 640, the received data is stored in the database cache random access memory. In the next step 650, the data structure is modified to remove data identifiers. In the next step 660, received data that does not contain an active identifier in the data structure is stored in electronic storage. The database cache random access memory is capable of being read at higher speed than the electronics storage. The method 600 can then continue receiving active data as described in step 630. The method 600 for configuring a database application interface can also be performed using the alternatives identified with respect to FIGS. 1-5.

Figure 7:
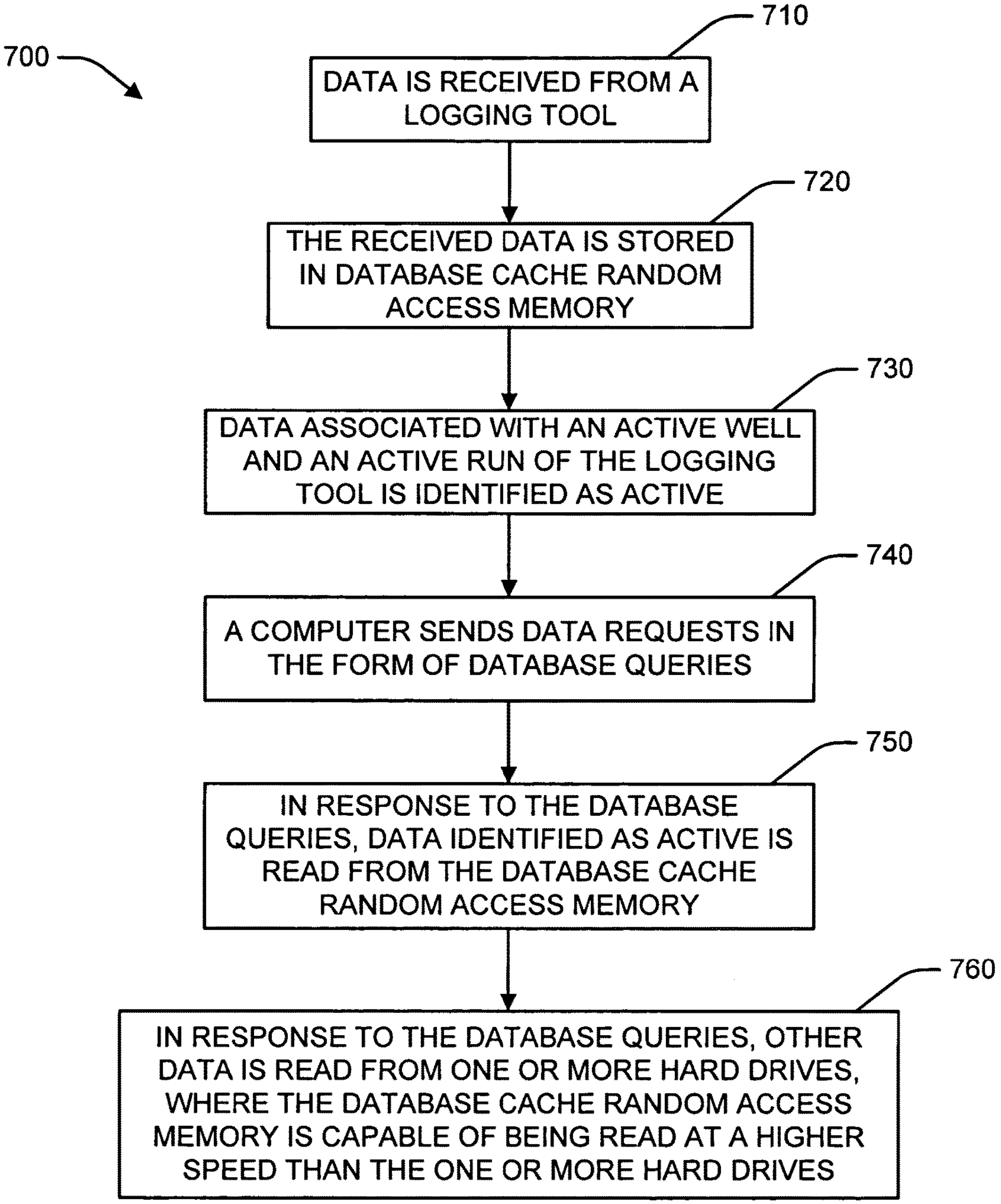
FIG. 7 is a flow chart of one embodiment of a method for handling well data.

A flow chart of one embodiment of a method 700 for handling well data is illustrated in FIG. 7. In the first step 710, data is received from a logging tool. In the next step 720, the received data is stored in database cache random access memory. In the next step 730, data associated with an active well and an active run of the logging tool is identified as active. In the next step 740, a computer sends data requests in the form of database queries. In the next step 750, in response to the database queries, data identified as active is read from the database cache random access memory. In the next step 760, in response to the database queries, other data is read from the one or more hard drives or hard disks. The database cache random access memory is capable of being read at a higher speed than the one or more hard drives. The method 700 can then continue with the computer sending additional data requests in the form of data queries as described in step 740. The method 700 for handling well data can also be performed using the alternatives identified with respect to FIGS. 1-5.

The foregoing description of the embodiments of the invention has been presented for the purposes of illustration and description. It is not intended to be exhaustive or to limit the invention to the precise form disclosed. Many modifications and variations are possible in light of the above teaching. One example modification would be associating additional keys with the data. For example, a user could add a key that stores an identifier of the job and/or add a key that stores an identifier of the field. It is intended that the scope of the invention be limited not by this detailed description, but rather by the claims appended hereto.

What is claimed is:

1. A system for handling well information, comprising:
- a sensor associated with a well and to produce sensor data;
- a memory coupled to receive sensor data and store the sensor data;
- an electronic storage; and
- a processor, wherein the processor is configured to perform executable instructions stored in a non-transitory tangible medium, wherein the instructions cause the processor to:
  - receive sensor data from the sensor;
  - determine whether the sensor data is active data, based, at least in part on whether the sensor data is from a current well, and if the sensor data is active data:
    - storing the sensor data in the memory;
  - otherwise, if the sensor is not active data:
    - storing the sensors data in the electronic storage;
- where the memory is capable of being read at higher speed than the electronic storage;
  - and wherein the executable instructions further cause the processor to:
  - determine whether sensor data stored in the memory is no longer active data and, if so, identify the sensor data as not active.

2. The system of claim 1, wherein the executable instructions further cause the processor to determine whether sensor data is from a real-time data input stream.

3. A method for handling well information, comprising:
- receiving sensor data from a sensor that is associated with a well;
- determining whether the sensor data is active data, based, at least in part on whether the sensor data is from a current well, and if the sensor data is active data:
  - storing the sensor data in a memory;
  - otherwise, if the sensor is not active data:
  - storing the sensor data in an electronic storage; and
- determining whether sensor data stored in the memory is no longer active data and, if so, identifying the sensor data as not active;

wherein the memory is capable of being read at higher speed than the electronic storage.

4. The method of claim 3, wherein determining whether sensor data stored in the memory is no longer active data and, if so, identifying the sensor data as not active, further comprises:
- determine whether sensor data is from a real-time data input stream.

* * * * *